(12) United States Patent
Hsu et al.

(10) Patent No.: US 7,405,891 B2
(45) Date of Patent: Jul. 29, 2008

(54) PROJECTION APPARATUS

(75) Inventors: Wei-Po Hsu, Miao-Li County (TW);
Chia-Lun Liu, Miao-Li County (TW);
Tai-Li Chang, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 73 days.

(21) Appl. No.: 11/533,694

(22) Filed: Sep. 20, 2006

(65) Prior Publication Data
US 2007/0081260 A1    Apr. 12, 2007

(30) Foreign Application Priority Data
Oct. 7, 2005    (TW) ............................... 94135131 A

(51) Int. Cl.
*G02B 7/02* (2006.01)
*G02B 9/00* (2006.01)

(52) U.S. Cl. ...................................... 359/808; 359/649

(58) Field of Classification Search ................. 359/819, 359/811, 822, 823, 694, 699, 827, 808, 649; 351/208, 205
See application file for complete search history.

(56) References Cited

U.S. PATENT DOCUMENTS

| | | | |
|---|---|---|---|
| 5,218,484 A * | 6/1993 | Terai | 359/823 |
| 6,364,491 B1 * | 4/2002 | Okada et al. | 353/101 |
| 6,816,324 B2 * | 11/2004 | Jang | 359/819 |

* cited by examiner

*Primary Examiner*—Mohammed Hasan
(74) *Attorney, Agent, or Firm*—J.C. Patents

(57) ABSTRACT

A projection apparatus including an optical engine, a ring, a lens and multiple casings is provided. The optical engine is suitable for producing an image light beam to project an image onto a screen. The ring is fixed on the optical engine. The lens is disposed outside the optical engine and located at a transmission path of the image light beam. The casings are assembled to the ring and connected to each other to form a lens barrel for fixing the lens, and the lens is driven to move relative to the optical engine and the ring by the lens barrel. The projection apparatus has a smaller overall dimension.

11 Claims, 6 Drawing Sheets

PROJECTION APPARATUS

CROSS-REFERENCE TO RELATED APPLICATION

This application claims the priority benefit of Taiwan application serial no. 94135131, filed Oct. 7, 2005. All disclosure of the Taiwan application is incorporated herein by reference.

BACKGROUND OF THE INVENTION

1. Field of the Invention

The present invention relates to a projection apparatus. More particularly, the present invention relates to a projection apparatus having a smaller overall dimension.

2. Description of the Related Art

In recent years, big and bulky display devices utilizing cathode ray tubes (CRT) are gradually replaced by products utilizing liquid crystal projection apparatus and digital light processing (DLP) projection apparatus. These products are not only light and portable, but can also be directly connected to any digital products for displaying images. With many manufacturers striving to produce cheaper and more competitive display products and providing additional functions, these products are now used in companies, schools and other public places. Gradually, even families can afford such products.

FIG. 1 is a perspective view of a conventional projection apparatus. As shown in FIG. 1, a conventional projection apparatus 100 comprises an optical engine (not shown), a projection lens assembly 110, and a housing 120 for enclosing the optical engine and the projection lens assembly 110. In general, the projection lens assembly 110 of the projection apparatus 100 has a modular design. In other words, the projection apparatus 100 can project images on a screen once the projection lens assembly 110 is securely fastened to the optical engine.

However, most modular projection lens assembly 110 are purchased from vendors, the process of assembling the projection lens assembly 110 to the optical engine requires additional operations. Therefore, it is difficult to reduce the overall production cost of the projection apparatus 100. In addition, the housing 120 must have a dimension and shape that fits the projection lens assembly 110 because the projection lens assembly 110 has a predetermined modular design. Specifically, because the dimension and shape of the modularized projection lens assembly 110 is fixed, it cannot be adapted to other models of projection apparatuses, which is rather inconvenient. Moreover, special tools are often required for properly adjusting the projection lens assembly 110 when the projection lens assembly 110 is assembled to an optical engine.

SUMMARY OF THE INVENTION

The present invention is provided a projection apparatus having a smaller overall dimension.

An embodiment of the invention provides a projection apparatus. The projection apparatus comprises an optical engine, a lens and a plurality of casings. The optical engine is suitable for producing an image. The lens is disposed outside the optical engine and located at a transmission path of the image. The casings are assembled to the optical engine and connected to each other to form a lens barrel having a lens-fixing groove for fixing the lens, and the lens is driven to move relative to the optical engine by the lens barrel.

Another embodiment of the present invention provides a projection apparatus comprising an optical engine, a plurality of rings, a lens and a plurality of casings. The optical engine is suitable for producing an image. The rings are fixed on the optical engine. The lens is disposed outside the optical engine and located at a transmission path of the image. The casings are assembled to the respective rings and connected to each other to form a lens barrel for fixing the lens and sleeving on the optical engine, and the lens is driven to move relative to the optical engine and the ring by the lens barrel.

Accordingly, a plurality of casings is utilized in the present invention to form a lens barrel. Furthermore, the lens barrel for carrying the lens is assembled directly to the optical engine and/or the ring so as to reduce the overall dimension of the projection apparatus.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and incorporated in constitute a part of this specification. The drawings illustrate embodiments of the invention with the description serve to explain the principles of the invention. In the drawings.

DESCRIPTION OF THE PREFERRED EMBODIMENTS

Figure 1:
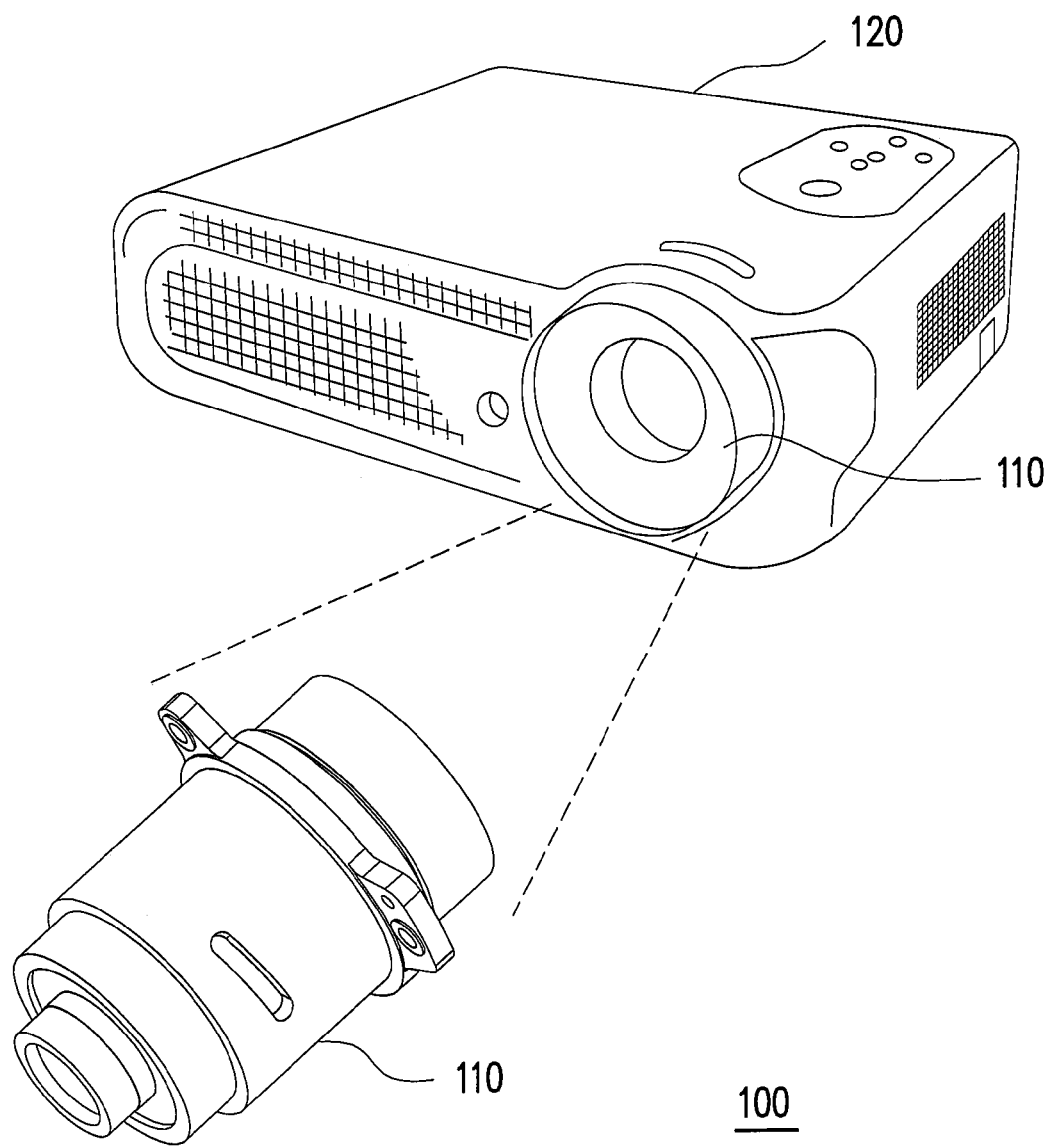
FIG. 1 is a perspective view of a conventional projection apparatus.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
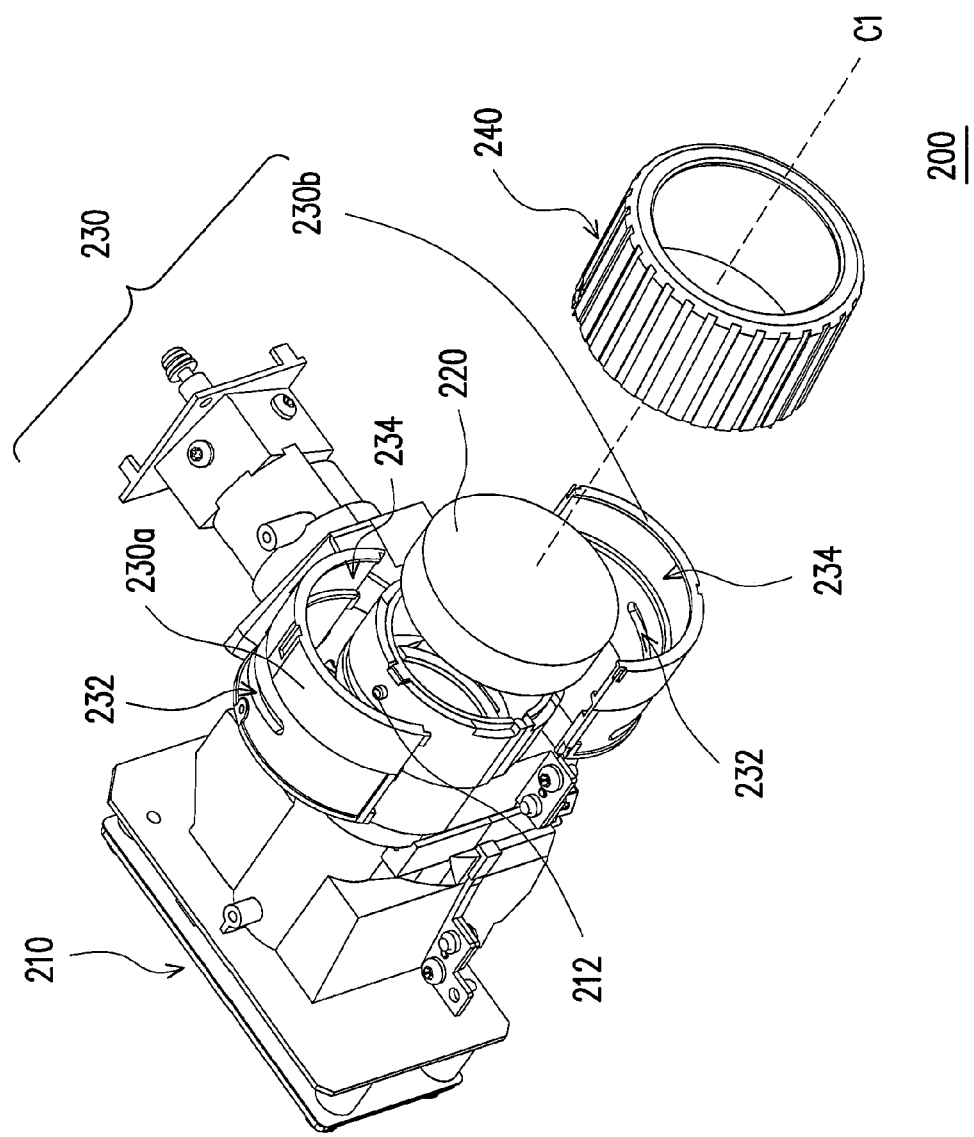
FIG. 2A is a diagram showing the dissociated components of a projection apparatus according to a first embodiment of the present invention.
Figure 2B:
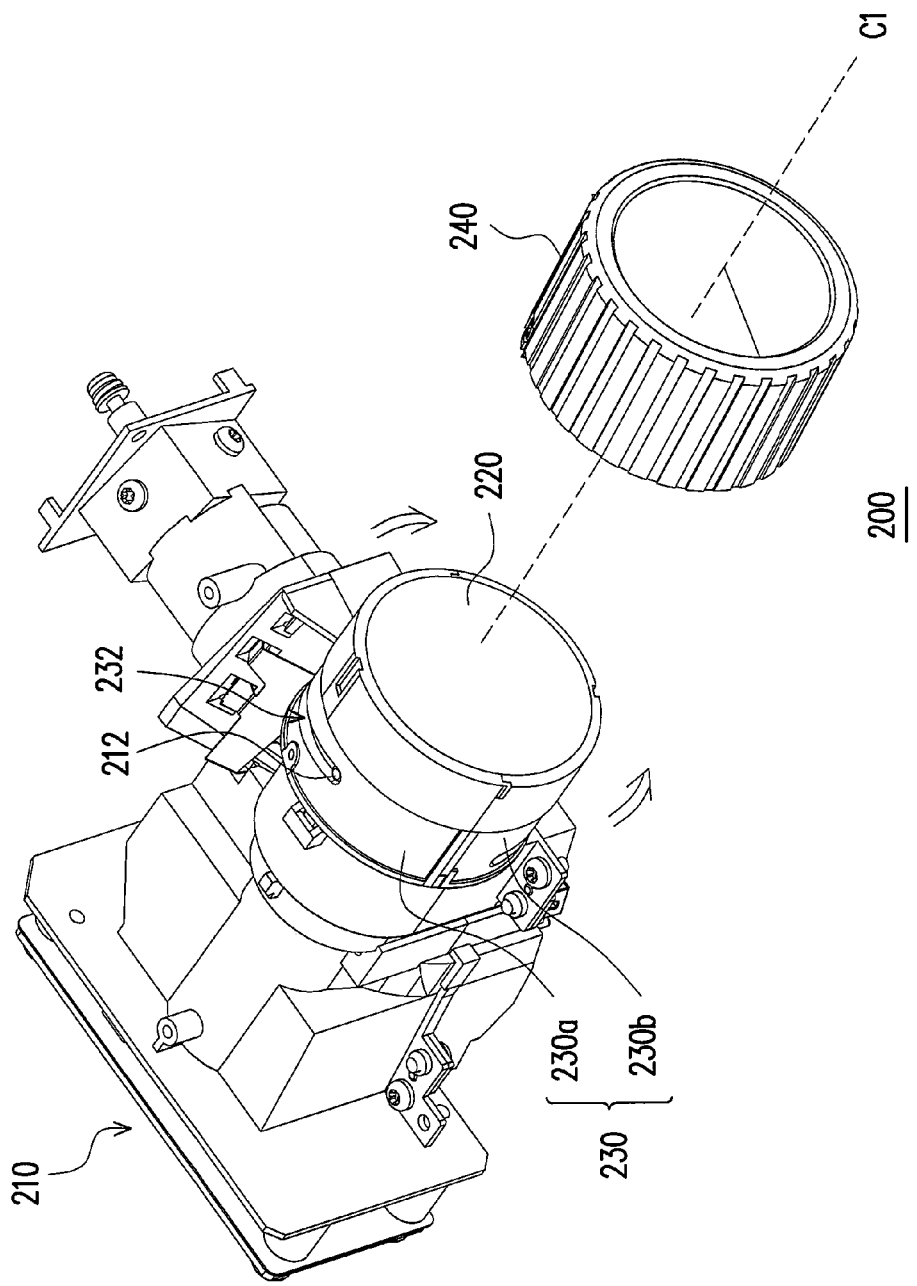
FIG. 2B is a perspective view showing a lens assembled to an optical engine in FIG. 2A.

FIG. 2A is a diagram showing the dissociated components of a projection apparatus according to a first embodiment of the present invention. FIG. 2B is a perspective view showing a lens assembled to an optical engine in FIG. 2A. As shown in FIGS. 2A and 2B, a projection apparatus 200 comprises an optical engine 210, a lens 220 and an upper casing 230a and a lower casing 230b. The optical engine 210 is suitable for producing an image light beam to project an image onto a screen (not shown). The lens 220 is disposed outside the optical engine 210 and located at a transmission path of the image light beam. The upper casing 230a and the lower casing 230b are assembled to the optical engine 210 and connected to each other to form a lens barrel 230 that sleeves on the optical engine 210. The lens 220 is fixed inside the lens barrel 230. Furthermore, the lens barrel 230 is driven so that the lens 220 moves forward or backward relative to the. optical engine 210.

In the present embodiment, the lens barrel 230 has a lens-fixing groove 234 and the lens 220 is fixed inside the lens barrel 230 by the lens-fixing groove 234. Although the lens barrel 230 in the present embodiment comprises an upper casing 230a and a lower casing 230b assembled to each other, the number of casings is not necessarily limited as such. In general, the lens barrel 230 is assembled by more than two casings.

To assemble the projection apparatus 200, the lens 220 is disposed in the front of the optical engine 210. Then, the upper casing 230a and the lower casing 230b are connected together to form a lens barrel 230 such that the lens 220 is fixed inside the lens-fixing groove 234. Simultaneously, the lens barrel 230 is assembled to the optical engine 210 so that the lens 220 is fixed on the optical engine 210. In the present embodiment, the upper casing 230a and the lower casing 230b are connected together by hooking, embedding or other connecting method.

In one preferred embodiment of the present invention, the lens barrel 230 defines a central axis C1. The lens barrel 230 rotates around the central axis C1 to drive the lens 220 to move forward or backward. More specifically, the lens barrel 230 has a guiding groove 232 and the optical engine 210 has a corresponding aligning protrusion 212. When the lens barrel 230 rotates around the central axis C1, the aligning protrusion 212 and the guiding groove 232 change positions relative to each other such that the lens barrel 230 moves forward or backward along the central axis C1. It should be noted that the lens barrel 230 extends forward or backward along the direction of the central axis C1 to adjust the position of the lens 220 when the lens barrel 230 rotates around the central axis C1.

In addition, an adjusting ring 240 is installed in the lens barrel 230 for a user to rotate the adjusting ring 240 and drive the lens barrel 230 rotate around the central axis C1, so that the lens 220 moves relative to the optical engine 210. This is an additional provision that facilitates the operation of the projection apparatus 200.

Figure 3A:
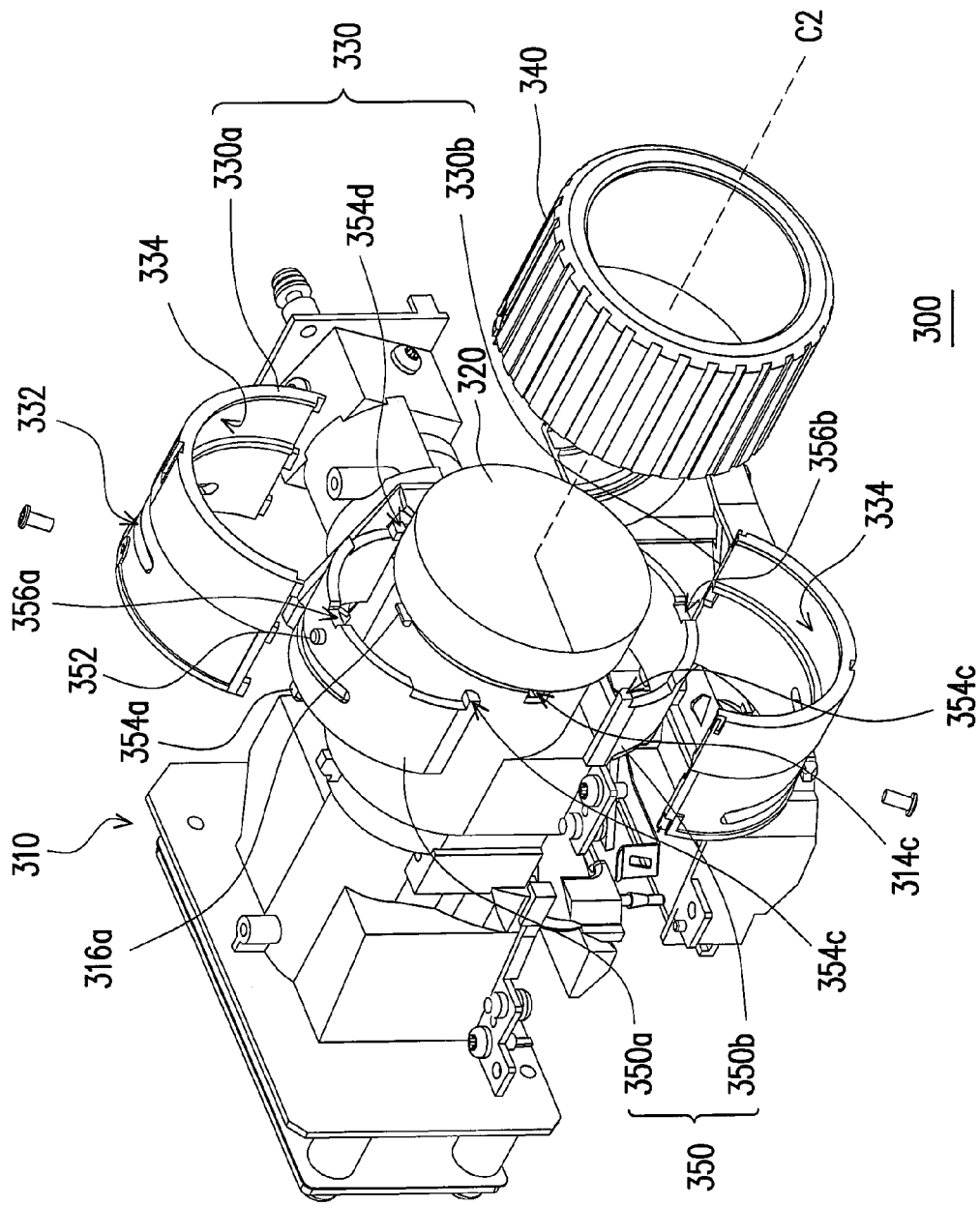
FIG. 3A is a diagram showing the dissociated components of a projection apparatus according to a second embodiment of the present invention.
Figure 3B:
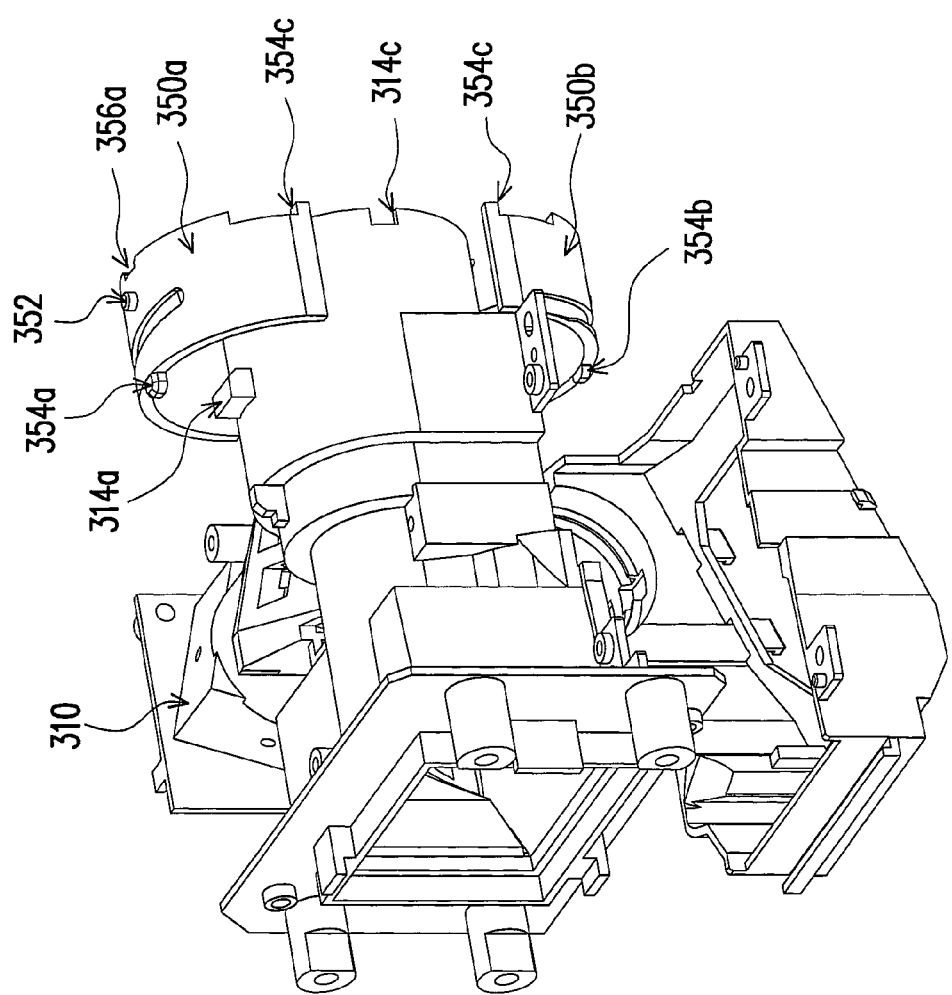
FIG. 3B is a diagram showing an optical engine and a ring in FIG. 3A.
Figure 3C:
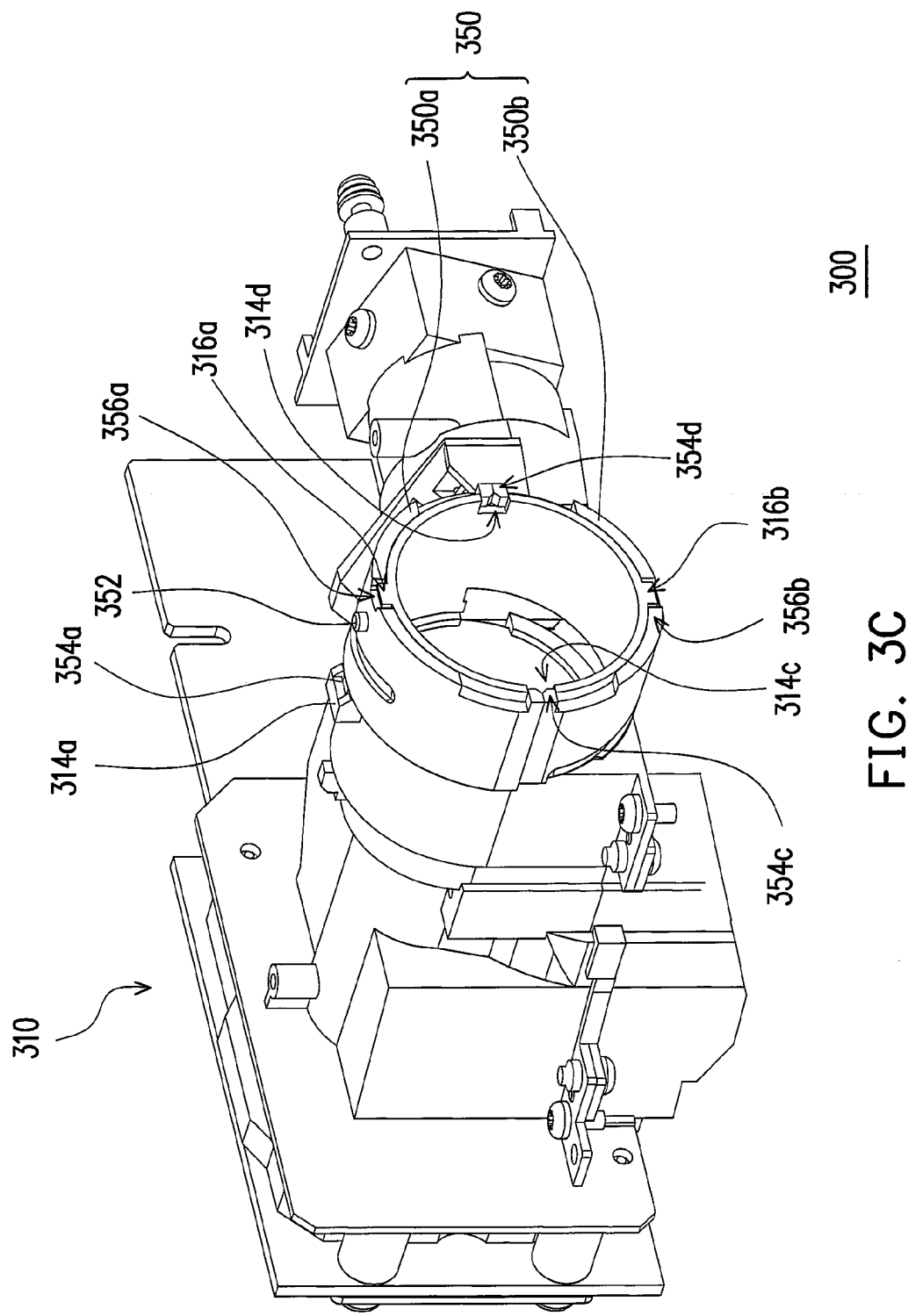
FIG. 3C is a diagram showing a ring assembled to an optical engine in FIG. 3A.

FIG. 3A is a diagram showing the dissociated components of a projection apparatus according to a second embodiment of the present invention. FIG. 3B is a diagram showing an optical engine and a ring in FIG. 3A. FIG. 3C is a diagram showing a ring assembled to an optical engine in FIG. 3A. As shown in FIGS. 3A, 3B and 3C, a projection apparatus 300 in the present embodiment comprises an optical engine 310, a ring 350, a lens 320 and an upper casing 330a and a lower casing 330b. The optical engine 310 is suitable for producing an image light beam to project an image onto a screen (not shown). The ring 350 is fixed on the optical engine 310. The lens 320 is disposed outside the optical engine 310 and located at a transmission path of the image light beam. The upper casing 330a and the lower casing 330b are assembled to the respective rings 350 and connected to each other to form a lens barrel 330 that sleeves on the optical engine 310. The lens 320 is fixed inside the lens barrel 330. Furthermore, the lens barrel 330 is driven to move the lens 320 relative to the optical engine 310 and the rings 350.

Although the lens barrel 330 in the present embodiment comprises an upper casing 330a and a lower casing 330b assembled to each other, the number of the casing is not necessarily limited as such. In general, the lens barrel 330 is assembled by more than two casings. Furthermore, to position the lens 320 firmly inside the lens barrel 330, both the upper casing 330a and the lower casing 330b have a lens-fixing groove 334, for example. Therefore, the lens 320 is fixed firmly inside the lens barrel 330 through the lens-fixing grooves 334.

In one preferred embodiment of the present invention, the rings 350 includes an upper ring 350a and a lower ring 350b connected to the upper ring 350a. To assemble the ring 350 to the optical engine 310, the optical engine 310 has an upper positioning groove 314a (shown in FIG. 3C) and a lower positioning groove (not shown). Furthermore, the upper ring 350a has an upper positioning protrusion 354a that corresponds to the upper positioning groove 314a. Similarly, the lower ring 350b has a lower positioning protrusion 354b (shown in FIG. 3B) that corresponds to the lower positioning groove (not shown). In addition, to fix the rings 350 firmly on the optical engine 310, the optical engine 310 has a left positioning groove 314c and a right positioning groove 314d, for example. The upper ring 350a and the lower ring 350b have a left positioning hook 354d that corresponds to the left positioning groove 314c and a right positioning hook 354d that corresponds to the right positioning groove 314d.

To strengthen the connection between the rings 350 and the optical engine 310 after assembly, the optical engine 310 further comprises an upper rib 316a and a lower rib 310b, for example. Furthermore, the upper ring 350a has an upper latching groove 356a that corresponds to the upper rib 316a and the lower ring 350b has a lower latching groove 356b corresponding to the lower rib 316b. In the present embodiment, the upper positioning protrusion 354a (shown in FIG. 3C) and the lower positioning protrusion 354b (shown in FIG. 3B) are lugs, for example. In other preferred embodiment, the upper positioning protrusion 354a and the lower positioning protrusion 354b are hooks, for example.

As shown in FIGS. 3A, 3B and 3C, to assemble the rings 350 to the optical engine 310, for example, the upper positioning protrusion 354a of the upper ring 350a is embedded into the upper positioning groove 314a of the optical engine 310. Simultaneously, the upper rib 316a of the optical engine 310 is latched to the upper latching groove 356a of the upper ring 350a. Furthermore, the left positioning hook 354c and the right positioning hook 354d of the upper ring 350a are latched to the left positioning groove 314c and the right positioning groove 314d of the optical engine 310 respectively. Thereafter, a similar method is used to assemble the lower ring 350b to the optical engine 310. Obviously, the present invention imposes no particular sequence for assembling the upper ring 350a and the lower ring 350b to the optical engine 310. In other words, the lower ring 350b is assembled to the optical engine 310 before assembling the upper ring 350a to the optical engine 310.

Thereafter, the upper casing 330a and the lower casing 330b are connected together to form a lens barrel 330 such that the lens barrel 330 assembled the lens 320 to the optical engine 310. It should be noted that the lens barrel 330 defines a central axis C2 and the lens barrel 330 rotates around the central axis C2 to drive the lens 320 to move forward and backward. More specifically, the lens barrel 330 has a guiding groove 332 and the rings 350 have a corresponding aligning protrusion 352 for refocusing the lens 320. When the lens barrel 330 rotates around the central axis C2, the aligning protrusion 352 and the guiding groove 332 change positions relative to each other such that the lens barrel 330 extends forward or backward along the central axis C2. It should be noted that the lens barrel 330 extends forward or backward along the direction of the central axis C2 to adjust the position of the lens 320 when the lens barrel 330 rotates around the central axis C2.

To facilitate the operation of a user, the projection apparatus 300 further comprises an adjusting ring 340 disposed on the lens barrel 330. The adjusting ring 340 is suitable for driving the lens barrel 330 to rotate around the central axis C2 so that the lens 320 moves.

In summary, the projection apparatus of the present invention has at least the following advantages:
1. The sequence of operations and the method of assembling the lens to the optical engine are easy and simple without any special tool.
2. The casings for assembling the lens directly to the optical engine are easy to fabricated and modified so that it is used in a variety of projection apparatus models.
3. The lens is directly assembled to the optical engine by casings so that the overall dimension of the projection apparatus is reduced.
4. It is no need to purchase a projection lens module from vendors, thereby the production cost is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A projection apparatus, comprising:
an optical engine suitable for producing an image light beam to project an image onto a screen;
a ring fixed on the optical engine, wherein the ring comprises:
an upper ring; and
a lower ring connected to the upper ring;
a lens disposed outside the optical engine and located at a transmission path of the image light beam; and
a plurality of casings assembled to the ring, the casings being connected to each other to form a lens barrel having a lens-fixing groove for fixing the lens, and the lens being driven to move relative to the optical engine and the ring by the lens barrel.

2. The projection apparatus of claim 1, wherein the optical engine has a positioning groove and the ring has a positioning protrusion corresponding to the positioning groove.

3. The projection apparatus of claim 2, wherein the positioning protrusion comprises a lug or a hook.

4. The projection apparatus of claim 1, wherein the optical engine has an upper positioning groove and a lower positioning groove, and the upper ring has an upper positioning protrusion corresponding to the upper positioning groove and the lower ring has a lower positioning protrusion corresponding to the lower positioning groove.

5. The projection apparatus of claim 1, wherein the optical engine further comprises a left positioning groove and a right positioning groove, and the upper ring and the lower ring respectively have a left positioning hook corresponding to the left positioning groove and a right positioning hook corresponding to the right positioning groove.

6. The projection apparatus of claim 1, wherein the optical engine has an upper rib and a lower rib, and the upper ring has an upper latching groove corresponding to the upper rib and the lower ring has a lower latching groove corresponding to the lower rib.

7. The projection apparatus of claim 1, wherein the lens barrel has a central axis, the lens barrel rotates around the central axis to drive the lens to move forward or backward.

8. The projection apparatus of claim 7, wherein the lens barrel has a guiding groove and the ring has a corresponding aligning protrusion, when the lens barrel rotates around the central axis the aligning protrusion and the guiding groove move relative to each other and the lens barrel extends along a direction of the central axis.

9. The projection apparatus of claim 7, further comprising an adjusting ring disposed on the lens barrel such that the adjusting ring drives the lens barrel to rotate around the central axis to move the lens forward or backward.

10. The projection apparatus of claim 1, further comprising an adjusting ring disposed on the lens barrel such that the adjusting ring drives the lens barrel to move the lens forward or backward relative to the optical engine.

11. The projection apparatus of claim 1, wherein the casings comprises:
an upper casing; and
a lower casing connected to the upper casing, the lens is fixed by the upper casing and the lower casing.

* * * * *